United States Patent [19]

Herrmann et al.

[11] 4,297,502
[45] Oct. 27, 1981

[54] AROMATIC BISAZOMETHINES, A METHOD FOR THEIR PREPARATION, AND THEIR USE AS REACTIVE PIGMENTS

[75] Inventors: Hans-Joachim Herrmann; Günther Meyer, both of Troisdorf; Klaus-Dieter Steffen, Hennef, all of Fed. Rep. of Germany

[73] Assignee: Dynamit Nobel Aktiengesellschaft, Troisdorf, Fed. Rep. of Germany

[21] Appl. No.: 161,182

[22] Filed: Jun. 19, 1980

[30] Foreign Application Priority Data

Jun. 21, 1979 [DE] Fed. Rep. of Germany ....... 2924964

[51] Int. Cl.³ .................. C07C 101/68; C07C 119/10
[52] U.S. Cl. ...................................... 560/35; 528/288; 528/292; 562/440; 564/272
[58] Field of Search .......................... 564/272; 560/35; 562/440

[56] References Cited

U.S. PATENT DOCUMENTS

| | | | |
|---|---|---|---|
| 3,457,301 | 7/1969 | Lenoir et al. | 560/35 |
| 3,743,667 | 7/1973 | Wagner et al. | 560/35 |
| 3,875,200 | 4/1975 | L'Eplattenier et al. | 560/35 |
| 3,939,194 | 2/1976 | L'Eplattenier et al. | 562/440 |
| 3,968,159 | 7/1976 | Iqbal | 564/270 |
| 4,052,433 | 10/1977 | Sahm | 560/35 |
| 4,058,563 | 11/1977 | Richter | 564/272 |
| 4,198,349 | 4/1980 | Nuss, Jr. et al. | 560/35 |
| 4,216,335 | 8/1980 | Krapcho et al. | 560/35 |

*Primary Examiner*—G. T. Breitenstein
*Attorney, Agent, or Firm*—Sprung, Felfe, Horn, Lynch & Kramer

[57] ABSTRACT

An aromatic bisazomethine prepared from the disubstituted benzidines and aromatic aldehydes, characterized by the general formula

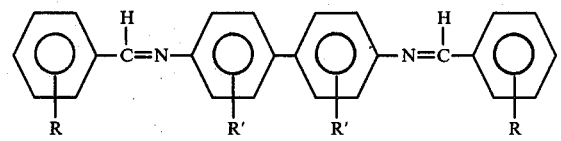

wherein
each R = COOCH₃, COOC₂H₅, COOH, CH₂Cl, CHCl₂, CH₂Br, CCl₃, Cl or Br and
each R' = Cl, OCH₃ or CH₃.

12 Claims, No Drawings

AROMATIC BISAZOMETHINES, A METHOD FOR THEIR PREPARATION, AND THEIR USE AS REACTIVE PIGMENTS

BACKGROUND OF THE INVENTION

1. Field of the Invention

The subject matter of the present invention is new aromatic bisazomethines having reactive substituents, and also a method of preparing these compounds. These new compounds are of an intense yellow to yellowish-green or orange color, and can be used particularly well as reactive pigments by virtue of their reactive groups.

2. Discussion of Prior Art

It has long been known to produce azomethines, which are referred to in the literature also as Schiff bases and have the following general formula:

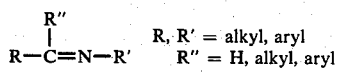

from primary amines and aldehydes or ketones, with the liberation of reaction water (e.g., benzal-aniline according to Schiff, Liebigs Annalen der Chemie, Supplement 3, 353):

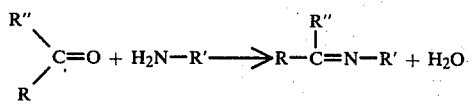

This reaction can also be applied to bifunctional amines, in which case bisazomethines are formed with the liberation of two moles of water. If diamines, such as phenylene diamines or benzidines, are used, colored compounds are formed. For example, German Offenlegungsschrift No. 2,410,036 describes colored bisazomethines prepared from β-naphthol-α-aldehydes substituted in the γ-position, with phenylenediamines and unsubstituted benzidine, which are produced in a boiling mixture of ethanol and glacial acetic acid. Branch et al. (J. chem. Soc. 1964, 9, pp. 3279–90, and ibid. 6, 1965, 3706) also use a mixture of ethanol and glacial acetic acid as solvents in the preparation of bisazomethines from p-alkoxybenzaldehydes (alkyl moiety = n-$C_7H_{15}$ to n-$C_{10}H_{21}$) and halogen-, methyl- or nitro-substituted benzidines. The corresponding p-methoxybenzaldehyde is used by Barnett et al. (Chem. Commun. 17, 1971, 1002) and M. J. S. Dewar et al. (J. Org. Chem. 30, 1965, p. 3485) for the condensation with benzidines.

Also, the reaction of chloro-, methyl- and methoxy-substituted benzidines with simple and ortho-hydroxybenzaldehyde as well as 2-hydroxy-1-naphthaldehyde has already been described by several Russian authors.

It is common to all of the above-cited methods that, for the attainment of adequate yields, catalysts must be added, usually acids such as acetic acid, and that, if these are not used, only moderate yields of sometimes only 10% of the theory can be obtained. Under these circumstances, it is not possible to use aldehydes or amines having additional delicate functional groups for the condensation without their reacting with the solvent or undergoing degradation. In addition, the separation of the products from the multicomponent mixture that results involves great time and effort.

There is a strong demand on the plastics market for yellow pigments having good thermal stability, color-fastness and no tendency to bleed. The problem, therefore, existed of preparing from substituted benzidines and aromatic aldehydes and having additional functional groups so as to be suitable, after condensation to the Schiff base, for reacting under severer conditions with other functional compounds such as amines, alcohols, phenols and the like. The problem also existed of determining the correct selection of the substituents on the benzidine and aldehyde benzene nucleus and of devising a gentle method of preparing these new compounds.

In the method to be selected, the assurance must furthermore be provided that, under the given conditions, only the amino and aldehyde functions will react with one another, and that other groups needed for a subsequent condensation will remain unaltered. The method must provide a high transformation of reactant and the desired product must be easily separated from the newly-formed by-products that may still be present, so as to minimize the amount of after-processing and the attendant risk of degradation.

SUMMARY OF THE INVENTION

Ths solution to this problem has been found in new aromatic bisazomethines from substituted benzidines and aromatic aldehydes, which are characterized by the formula

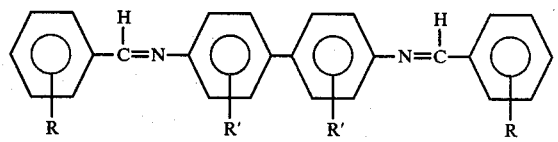

wherein
each R = halogen, $CCl_3$, $CHX_2$, $CH_2X$, $COOR''$ (X = Cl, Br, and R'' = H, $CH_3$, $C_2H_5$) and
each R' = Cl, $OCH_3$ or $CH_3$.

Furthermore, a method has been found for the preparation of these compounds, which is characterized by the reaction of benzidines of the formula

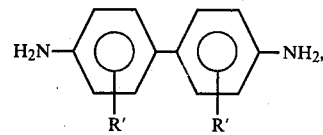

in which R' has the same meaning as above, with aromatic aldehydes of the formula

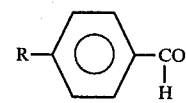

wherein R has the same meaning as above, in the absence of any catalyst, at temperatures between 10° and 200° C., in a solvent which forms an azeotrope with water, and by the separation of this azeotrope from the reaction mixture as it forms.

In principle, one can prepare the new compounds in any other solvent, or in the molten state without the use of solvent. Even in these cases the presence of a catalyst, such as an acid, is unnecessary. It is important, however, that the liberation of the water and its removal take place under gentle conditions. This can also be accomplished, for example, by heating the reaction mixture at relatively low temperatures, e.g., 30° to 60° C., for a sufficiently long time. However, in such a case, if the process is not performed in a solvent forming an azeotrope with water, the volume-time yield can only be relatively low.

Preferably, the new azomethine compounds are therefore prepared in a solvent forming an azeotrope with water, the preferred temperature range being between 30° and 140° C. Furthermore, the temperature at which the azeotropic mixture formed from water and the solvent boils serves as an especially preferred low temperature limit.

In the benzidines used as the starting product the substituents can be either in the second position or in the third position. The preferred diamine component is 3,3'-di-chlorobenzidine.

Instead of the free benzidine bases, benzidine salts with strong inorganic or organic acids can be used, such as for example the hydrochlorides or sulfates. Particularly contemplated benzidine salts are benzidine salts such as

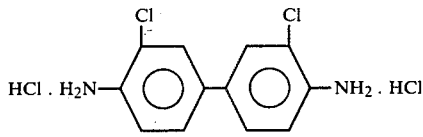

The aldehyde components that can be used in accordance with the invention include terephthalic and isophthalic aldehydic acid, terephthalic and isophthalic aldehydic acid methyl and ethyl esters, m-chloromethylbenzaldehyde, dichloromethyl and trichloromethyl benzaldehyde, bromomethyl and dibromomethyl benzaldehyde, bromobenzaldehyde and chlorobenzaldehyde, preferably the aldehydic ester.

The substituents of the benzaldehydes are in the para or meta position. The number of substituents can also be greater than 1 if desired.

In order to remove the reaction water in a gentle manner, those solvents are used which form an azeotropic mixture with the reaction water and remove the latter from the reaction mixture rapidly, before other substituents are attacked by it. These include saturated or unsaturated aliphatic or aromatic hydrocarbons or chlorinated hydrocarbons. The following are examples: benzene, toluene, the xylenes, chloroform, n-hexane, n-heptane, and higher open-chain or cyclic hydrocarbons of the aromatic or aliphatic series. Aliphatic alkyl esters of low aliphatic carboxylic acids ($C_1$ to $C_4$), such as acetic acid ethyl esters, for example, are suitable.

The end of the reaction can be recognized by the cessation of the liberation of water. The usually intensely colored reaction product is then almost entirely in the form of a solid in an easily filtrable suspension.

The starting products are preferably used in stoichiometric ratios, although one component can also be used in an excess in relation to the second.

The weight ratio of the solvent to the reaction components can vary widely. The amount of solvent is advantageously such that the reaction product will be obtained largely in pure form at the end of the reaction, while the entire reaction mixture remains stirrable. This is especially the case when the amount of solvent is between the same as that of the reactants and twenty times that of the weight of the reactants.

As soon as the reaction has ended, the usually solid reaction product is filtered out, washed with solvent if necessary, and dried at elevated temperature, and at reduced pressure if necessary. After the solvent has been purified by distillation, it can be reused.

The method of the invention has the following advantages over the known method. The condensation to the Schiff base takes place surprisingly without the addition of a catalyst, under very gentle conditions. This manifests itself very impressively in the fact that for the first time bisazomethines are obtained in a high purity, even when they contain a delicate functional group, which is unaltered by the reaction. In spite of these mild conditions, it is possible by means of the removal of the reaction water by azeotropic distillation to achieve an approximately complete transformation and therefore a high yield. The isolation of the reaction products is accomplished by simple filtration followed by drying. The bisazomethines obtained are distinguished by a high purity. After purification by distillation the extractant can be recycled.

The new bisazomethines are intensely yellow or yellowish green to orange colored, powdery, crystalline substances which have high melting point from about 120° to more than 320° C. They are slightly soluble in the common organic solvents. Their thermal stability is considerable. This has additionally been confirmed by thermogravimetric analysis. The new bisazomethines thus obtained have reactive substituents which are accessible for further condensation reactions. The new bisazomethines can thus be incorporated into polymers by conventional methods, where they manifest an excellent thermal stability. For example, the bisazomethine obtained from 3,3'-dichlorobenzidine and terephthaldehydic acid methyl ester can be condensed at 250° C. with terephthalic acid dimethyl ester and butanediol to a yellowish green polyester. A colored polyester of this kind is characterized particularly by the fact that, due to the fine, uniform distribution of the chromophore, an intense coloring is obtained, and there is no bleeding or chalking of the pigment component even after months of use at elevated temperatures.

The amounts of the new bisazomethines which need to be incorporated into solids in order to give them this color are extraordinarily small. As little as 0.01%, with respect to the weight of the mass to be pigmented, suffices to provide the latter with a visible tint. In general, amounts of no more than 0.05 to 1% by weight, are accordingly required in order to provide a composition with sufficient coloring. Larger amounts can, of course, be added, but then the color deepening effect does not increase as greatly.

The aromatic bisazomethine of the invention can be used in pigmenting thermoplastics and thermosetting synthetic polymers, including in particular polytetramethyleneterephthalate, polyethyleneterephthalate, polyamides of terephthalic acid and/or isophthalic acid.

EXAMPLES

Example 1

25 g of 2,2'-dichlorbenzidine was dissolved in 100 g of toluene by heating, and refluxed with stirring. Then a solution of 30 g of terephthaldehydic acid in 100 g of toluene was added gradually over half an hour. The mixture turned yellow, and a solid of the same color began to precipitate. The water that simultaneously formed was removed from the reaction vessel as an azeotrope with toluene of a boiling point of 84° C. under standard conditions through a superimposed rectifying column, dripped after condensation into a water separator with a volumetric measuring system, and then removed therefrom. As soon as water ceased to be liberated, which was the case after about 2 to 3 hours, refluxing was continued for one more hour in order to complete the condensation. Then the product was suction filtered hot and washed with 100 g of hot toluene.

The toluene-moist filter cake was freed of solvent at 180° C. in a vacuum of 20 millibars. The resultant product was 50.5 grams (yield: 91% of the theory) of a very finely granular, yellow solid of high thermal stability having a melting point above 320° C. and having the following structural formula:

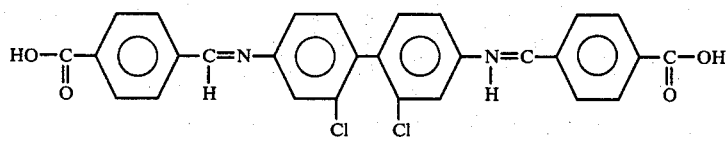

A portion of the azomethine obtained was incorporated in various amounts into polytetramethylene terephthalate. At a content of as little as 0.01% by weight, the mass assumed a visible yellow tint. At a content of 0.05%, it was definitely yellow-colored and preserved this color for several months at room temperature.

Example 2

25.3 g of 3,3'-dichlorbenzidine in moist commercial form was dissolved by heating in 100 g of p-xylene and heated at ebullition, thereby removing the residual moisture. Then 32.8 g of melted terephthalaldehydic acid methyl ester was allowed to flow into the solution over a period of half an hour, and the mixture was heated at ebullition. The reaction water that formed was separated through a column and removed as described in Example 1. As an azeotrope with p-xylene it distilled at 92° C. After two to three hours, no more water passed over, and upon cooling a yellow-green product precipitated, which was removed by filtration and washed with 100 g of p-xylene.

After drying at 160° C. and 20 mbar pressure, the product was 48.5 g (corresponding to a yield of 89% of the theory) of a yellow-green solid of a melting point of 248° to 249° C., whose carboxylic acid ester groups are unaltered, and can be made to react at elevated temperatures with alcohols, amines and the like to produce colored oligomeric and polymeric products.

Example 3

24.8 g of 3,3'-dimethoxybenzidine was dissolved in 100 g of toluene, and 37.8 g of p-dichloromethylbenzaldehyde was added. Upon heating, 3.6 g of reaction water was removed azeotropically as described in Example 1. Then the mixture was allowed to cool. An intensely yellow substance precipitated, which was washed with 60 g of toluene and dried at 60° C. and 20 mbar. The yield was 51.4 g, corresponding to 87% of the theory.

The structural formula:

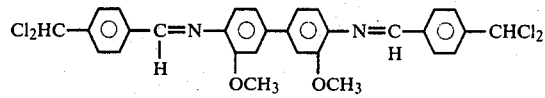

was confirmed by elemental analysis and infrared spectroscopy.

Example 4

25.3 g of 2.2'-dichlorbenzidine was dissolved in 100 g of toluene. 28.8 g of p-chloromethylbenzaldehyde was added to the solution and it was treated as described in Example 1. A bright yellow substance with a melting point of 180° C. was obtained in a quantity of 45.2 g, which corresponds to a yield of 89% of the theory.

The structural formula:

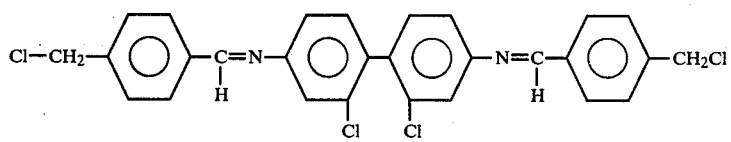

is confirmed by elemental analysis and infrared spectroscopy.

Example 5

25.3 g of 3,3'dichlorbenzidine was dissolved in 100 g of benzene and 28.8 g of p-chloromethylbenzaldehyde was added. The rest of the procedure was performed as described in Example 1. After 4 hours of reaction, 40.4 g (80% of the theory) was obtained of an intensely yellow powder having a melting point of 167° C. and the formula

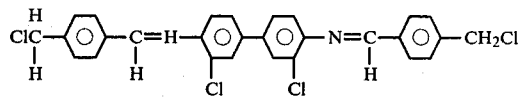

the formula was confirmed by infrared spectroscopy and elemental analysis.

Example 6

25.3 g of 3,3'-dichlorbenzidine was suspended in 150 g of n-heptane, and 32.8 g of terephthalaldehydic acid methyl ester was added hot. The mixture was heated et ebullition and, over a period of 8 hours, 3.3 g of reaction water was distilled azeotropically. A yellow-green suspension was obtained, from which the bisazomethine was removed by filtration while hot, washed with 50 g of n-heptane and dried at 80° C. and 20 mbar. The yield was 50.1 g of a greenish-yellow azomethine having a sharp melting point at 248° C., corresponding to 92% of the theory. The product corresponded to the structural formula:

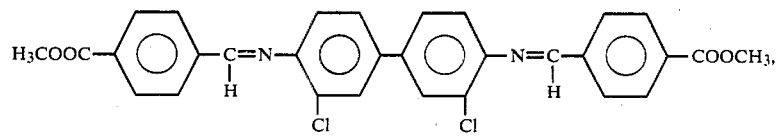

which was confirmed by infrared spectroscopy and elemental analysis. The dye thus obtained was added in amounts of 0.01% in the preparation of polytetramethyleneterephthalate. The polymer obtained had a definite yellow color.

Example 7

25.3 g of 2,2'-dichlorbenzidine is dissolved in 120 g of benzene and 28.8 g of m-chlormethylbenzaldehyde is added. The same procedure as described in Example 1 is followed. 36.3 g of a deep yellow bisazomethine is obtained having a melting point of 134° C. and the structural formula:

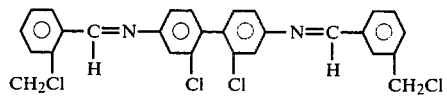

The structural formula was confirmed by the infrared spectrum and elemental analysis.

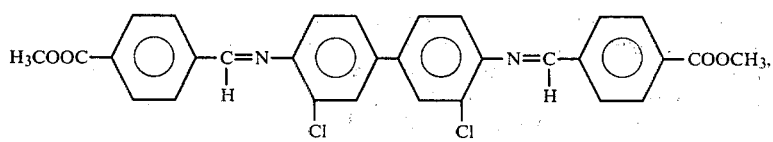

12. A bisazomethine according to claim 1, of the formula
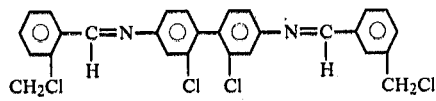

What is claimed is:

1. An aromatic bisazomethine prepared from disubstituted benzidines and aromatic aldehydes, characterized by the general formula

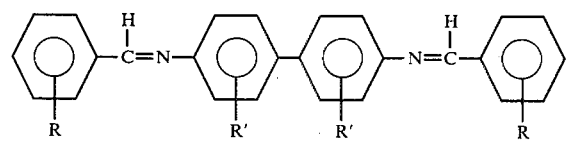

wherein
each R = COOCH$_3$, COOC$_2$H$_5$, COOH, CH$_2$Cl, CHCl$_2$, CH$_2$Br, CCl$_3$, Cl or Br and
each R' = Cl, OCH$_3$ or CH$_3$.

2. An aromatic bisazomethine according to claim 1, wherein at least one R is CH$_2$Cl or CHCl$_2$.

3. An aromatic bisazomethine according to claim 1, wherein at least one R' is chlorine.

4. A bisazomethine according to claim 1, wherein at least one R' is methoxy.

5. A bisazomethine according to claim 1, wherein at least one R moiety is carboxyl.

6. An aromatic bisazomethine according to claim 1, wherein at least one R moiety is COOCH$_3$.

7. An aromatic bisazomethine according to claim 1, of the formula

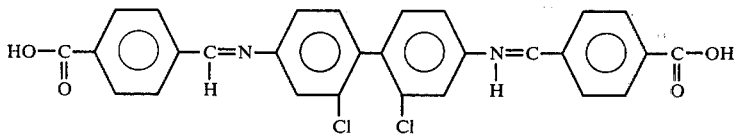

8. An aromatic bisazomethine according to claim 1 of the formula

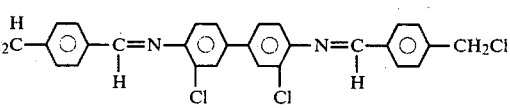

9. A bisazomethine according to claim 1, of the formula

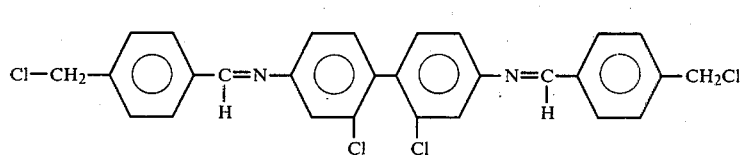

10. A bisazomethine according to claim 1, of the formula

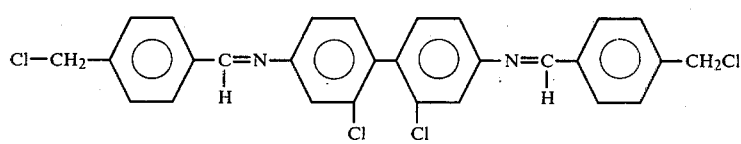

11. A bisazomethine according to claim 1, of the formula